(12) United States Patent
Wallack

(10) Patent No.: US 6,751,338 B1
(45) Date of Patent: Jun. 15, 2004

(54) SYSTEM AND METHOD OF USING RANGE IMAGE DATA WITH MACHINE VISION TOOLS

(75) Inventor: Aaron S. Wallack, Natick, MA (US)

(73) Assignee: Cognex Corporation, Natick, MA (US)

( * ) Notice: Subject to any disclaimer, the term of this patent is extended or adjusted under 35 U.S.C. 154(b) by 493 days.

(21) Appl. No.: 09/738,962

(22) Filed: Dec. 15, 2000

(51) Int. Cl.⁷ .................................................. G06K 9/00
(52) U.S. Cl. ....................... 382/106; 382/103; 382/141; 382/154; 382/181; 356/3
(58) Field of Search ................................ 382/103, 106, 382/141, 153, 154, 159, 181, 190, 289, 294; 356/3

(56) References Cited

U.S. PATENT DOCUMENTS

| | | | |
|---|---|---|---|
| 6,137,893 A | 10/2000 | Michael et al. | 382/103 |
| 6,173,070 B1 | 1/2001 | Michael et al. | 382/145 |
| 6,222,583 B1 * | 4/2001 | Matsumura et al. | 348/113 |
| 6,578,017 B1 * | 6/2003 | Ebersole et al. | 706/3 |

OTHER PUBLICATIONS

"3D CAD–Based Inspection I: Coarse Verification" by Newman et al. Pattern Recognition, 1992. vol. 1. Conference A: Computer Vision and Applications, Proceedings., 11th IAPR International Conference on , Aug. 30–Sep. 3, 1992, Page(s): 49–52.*

"A Fuzzy Logic Automatic Target Detection System For LADAR Range Images" by Keller et al., Fuzzy Systems Proceedings, 1998. IEEE World Congress on Computational Intelligence., The 1998 IEEE International Conference on , vol.: 1 , May 4–9, 1998 Page(s): 7.*

"CAD–Based Inspection of 3D Objects Using Range Images" by Newman et al. CAD–Based Vision Workshop, 1994., Proceedings of the 1994 Second , Feb. 8–11, 1994 Page(s): 236–243.*

U.S. patent application Ser. No. 09/738,941, Wallack, filed Dec. 15, 2000.

U.S. patent application Ser. No. 09/336,671, Wallack, filed Dec. 15, 2000.

"A Tutorial on Visual Servo Control" Seth Hutchinson, Greg Hager and Peter Corke, May 14, 1996; 42 pages.

\* cited by examiner

*Primary Examiner*—Amelia M. Au
*Assistant Examiner*—Chong Kim
(74) *Attorney, Agent, or Firm*—William Loginov

(57) ABSTRACT

A system and method for using a machine vision system to locate and register patterns in an object using range data is provided. The machine vision system includes an acquisition system for acquiring a range image of an object. The system also includes a machine vision search tool coupled to the acquisition system for locating an instance of a trained pattern in the image. The tool registering the trained pattern transformed by at least two translational degrees of freedom and at least one non-translational degree of freedom with respect to an image plane. The acquisition system preferably includes a three-dimensional camera.

16 Claims, 8 Drawing Sheets

| X\Y | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| 0 | 10 | 20 | 30 | 40 | 50 | 50 | 50 | 50 | 50 | 50 | 50 | 50 | 50 | 50 | 50 | 50 |
| 1 | 10 | 20 | 30 | 40 | 50 | 60 | 60 | 60 | 60 | 60 | 60 | 60 | 60 | 60 | 60 | 60 |
| 2 | 10 | 20 | 30 | 40 | 50 | 60 | 70 | 70 | 70 | 70 | 70 | 70 | 70 | 70 | 70 | 70 |
| 3 | 10 | 20 | 30 | 40 | 50 | 60 | 80 | 80 | 80 | 80 | 80 | 80 | 80 | 80 | 80 | 80 |
| 4 | 10 | 20 | 30 | 40 | 50 | 60 | 70 | 90 | 90 | 90 | 90 | 90 | 90 | 90 | 90 | 90 |
| 5 | 10 | 20 | 30 | 40 | 50 | 60 | 70 | 100 | 100 | 100 | 100 | 100 | 100 | 100 | 100 | 100 |
| 6 | 10 | 20 | 30 | 40 | 50 | 60 | 70 | 80 | 110 | 110 | 110 | 110 | 110 | 110 | 110 | 110 |
| 7 | 10 | 20 | 30 | 40 | 50 | 60 | 70 | 80 | 120 | 120 | 120 | 120 | 120 | 120 | 120 | 120 |
| 8 | 10 | 20 | 30 | 40 | 50 | 60 | 70 | 80 | 90 | 130 | 130 | 130 | 130 | 130 | 130 | 130 |
| 9 | 10 | 20 | 30 | 40 | 50 | 60 | 70 | 80 | 90 | 100 | 100 | 100 | 100 | 100 | 100 | 100 |
| 10 | 10 | 20 | 30 | 40 | 50 | 60 | 70 | 80 | 90 | 90 | 90 | 90 | 90 | 90 | 90 | 90 |
| 11 | 10 | 20 | 30 | 40 | 50 | 60 | 70 | 80 | 70 | 80 | 80 | 80 | 80 | 80 | 80 | 80 |
| 12 | 10 | 20 | 30 | 40 | 50 | 60 | 70 | 60 | 60 | 70 | 70 | 70 | 70 | 70 | 70 | 70 |
| 13 | 10 | 20 | 30 | 40 | 50 | 60 | 50 | 50 | 50 | 60 | 60 | 60 | 60 | 60 | 60 | 60 |
| 14 | 10 | 20 | 30 | 40 | 50 | 60 | 40 | 40 | 40 | 50 | 50 | 50 | 50 | 50 | 50 | 50 |
| 15 | 10 | 20 | 30 | 40 | 50 | 60 | 30 | 30 | 30 | 40 | 40 | 40 | 40 | 40 | 40 | 40 |
| 16 | 10 | 20 | 30 | 40 | 50 | 20 | 20 | 20 | 20 | 30 | 30 | 30 | 30 | 30 | 30 | 30 |
| 17 | 10 | 20 | 30 | 40 | 50 | 20 | 20 | 20 | 20 | 20 | 20 | 20 | 20 | 20 | 20 | 20 |

| X\Y | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| 0  | 255 | 255 | 255 | 255 | 255 | 255 | 255 | 255 | 255 | 255 | 255 | 255 | 255 | 255 | 255 | 255 |
| 1  | 255 | 255 | 255 | 255 | 255 | 255 | 255 | 255 | 255 | 255 | 255 | 255 | 255 | 255 | 255 | 255 |
| 2  | 255 | 255 | 255 | 150 | 21  | 0   | 150 | 255 | 255 | 255 | 255 | 255 | 255 | 255 | 255 | 255 |
| 3  | 255 | 255 | 255 | 21  | 0   | 0   | 21  | 150 | 255 | 255 | 255 | 255 | 255 | 255 | 255 | 255 |
| 4  | 255 | 255 | 255 | 0   | 21  | 150 | 255 | 150 | 21  | 255 | 255 | 255 | 255 | 255 | 255 | 255 |
| 5  | 255 | 255 | 255 | 0   | 150 | 255 | 255 | 255 | 150 | 255 | 255 | 255 | 255 | 255 | 255 | 255 |
| 6  | 255 | 255 | 255 | 21  | 255 | 255 | 255 | 255 | 255 | 255 | 255 | 255 | 255 | 255 | 255 | 255 |
| 7  | 255 | 255 | 255 | 150 | 255 | 255 | 255 | 255 | 255 | 255 | 255 | 255 | 255 | 255 | 255 | 255 |
| 8  | 255 | 255 | 255 | 255 | 255 | 255 | 255 | 255 | 255 | 255 | 255 | 255 | 255 | 255 | 255 | 255 |
| 9  | 255 | 255 | 255 | 255 | 255 | 255 | 255 | 255 | 255 | 255 | 255 | 255 | 255 | 255 | 255 | 255 |
| 10 | 255 | 255 | 255 | 255 | 45  | 0   | 0   | 0   | 0   | 0   | 0   | 0   | 0   | 0   | 0   | 0   |
| 11 | 255 | 255 | 255 | 45  | 0   | 0   | 0   | 0   | 0   | 0   | 0   | 0   | 0   | 0   | 0   | 0   |
| 12 | 255 | 255 | 255 | 0   | 0   | 0   | 0   | 0   | 0   | 45  | 255 | 255 | 255 | 255 | 255 | 255 |
| 13 | 255 | 255 | 255 | 45  | 45  | 0   | 0   | 0   | 45  | 255 | 255 | 255 | 255 | 255 | 255 | 255 |
| 14 | 255 | 255 | 255 | 0   | 0   | 0   | 0   | 45  | 255 | 255 | 255 | 255 | 255 | 255 | 255 | 255 |
| 15 | 255 | 255 | 255 | 0   | 0   | 0   | 45  | 255 | 255 | 255 | 255 | 255 | 255 | 255 | 255 | 255 |
| 16 | 255 | 255 | 255 | 0   | 0   | 45  | 255 | 255 | 255 | 255 | 255 | 255 | 255 | 255 | 255 | 255 |
| 17 | 255 | 255 | 255 | 0   | 45  | 255 | 255 | 255 | 255 | 255 | 255 | 255 | 255 | 255 | 255 | 255 |

| Y\X | 0 | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|---|
| 15 | 50 | 60 | 70 | 80 | 90 | 100 | 110 | 120 | 102 | 93 | 90 | 80 | 70 | 60 | 50 | 40 | 30 | 20 |
| 14 | 50 | 60 | 70 | 80 | 90 | 100 | 110 | 120 | 102 | 93 | 90 | 80 | 70 | 60 | 50 | 40 | 30 | 20 |
| 13 | 50 | 60 | 70 | 80 | 90 | 100 | 110 | 120 | 102 | 93 | 90 | 80 | 70 | 60 | 50 | 40 | 30 | 20 |
| 12 | 50 | 60 | 70 | 80 | 90 | 100 | 110 | 120 | 102 | 93 | 90 | 80 | 70 | 60 | 50 | 40 | 30 | 20 |
| 11 | 50 | 60 | 70 | 80 | 90 | 100 | 110 | 120 | 102 | 93 | 90 | 80 | 70 | 60 | 50 | 40 | 30 | 20 |
| 10 | 50 | 60 | 70 | 80 | 90 | 100 | 110 | 120 | 100 | 92 | 90 | 80 | 70 | 60 | 50 | 40 | 30 | 20 |
| 9 | 50 | 60 | 70 | 80 | 90 | 100 | 110 | 111 | 94 | 87 | 79 | 73 | 70 | 60 | 50 | 40 | 30 | 20 |
| 8 | 50 | 60 | 70 | 80 | 90 | 94 | 90 | 87 | 84 | 79 | 73 | 68 | 62 | 55 | 50 | 40 | 30 | 20 |
| 7 | 50 | 60 | 70 | 76 | 76 | 77 | 76 | 75 | 77 | 80 | 69 | 64 | 59 | 53 | 47 | 41 | 30 | 20 |
| 6 | 50 | 59 | 61 | 62 | 64 | 65 | 68 | 70 | 70 | 70 | 70 | 70 | 58 | 51 | 47 | 42 | 37 | 31 |
| 5 | 49 | 50 | 51 | 53 | 57 | 60 | 60 | 60 | 60 | 60 | 60 | 60 | 60 | 47 | 41 | 38 | 35 | |
| 4 | 40 | 42 | 47 | 50 | 50 | 50 | 50 | 50 | 50 | 50 | 50 | 50 | 50 | 50 | 38 | 34 | | |
| 3 | 37 | 40 | 40 | 40 | 40 | 40 | 40 | 40 | 40 | 40 | 40 | 40 | 40 | 40 | 40 | 40 | | |
| 2 | 30 | 30 | 30 | 30 | 30 | 30 | 30 | 30 | 30 | 30 | 30 | 30 | 30 | 30 | 30 | | | |
| 1 | 20 | 20 | 20 | 20 | 20 | 20 | 20 | 20 | 20 | 20 | 20 | 20 | 20 | 20 | 20 | | | |
| 0 | 10 | 10 | 10 | 10 | 10 | 10 | 10 | 10 | 10 | 10 | 10 | 10 | 10 | 10 | 10 | | | |

FIGURE 7A
FIGURE 7B
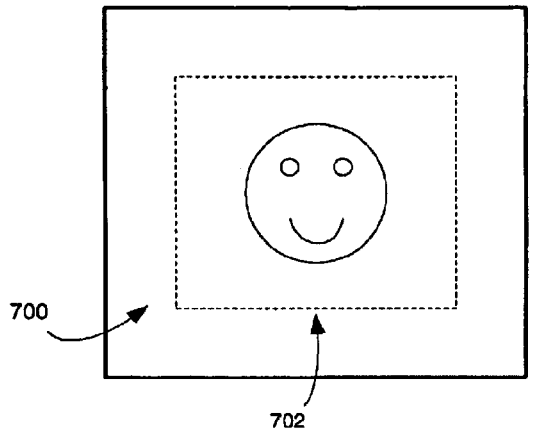
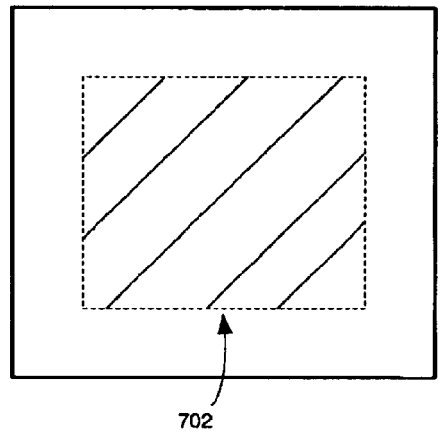
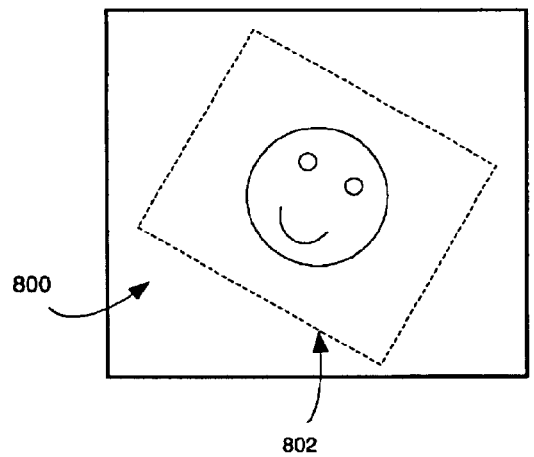
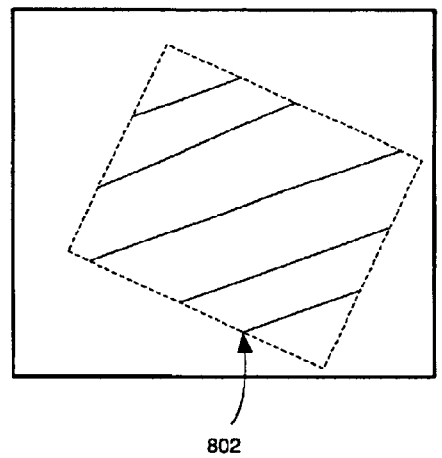
FIGURE 8A
FIGURE 8B

|   | 1 | 2 | Y |
|---|---|---|---|
| 1 | 200 | 200 | |
| 2 | 100 | 100 | |
| 3 | 50 | 50 | |
| X | | | 700 |

FIGURE 7C

|   | 1 | 2 | Y |
|---|---|---|---|
| 1 | 175 | 175 | |
| 2 | 75 | 75 | |
| 3 | 25 | 25 | |
| X | | | 800 |

FIGURE 8C

SYSTEM AND METHOD OF USING RANGE IMAGE DATA WITH MACHINE VISION TOOLS

This application is related to commonly owned U.S. patent application Ser. Nos. 09/738,941 and 09/738,564, both filed on Dec. 15, 2000, and respectively entitled SYSTEM AND METHOD FOR SERVING OF ROBOTS USING FIDUCIAL MARKS AND MACHINE VISION AND SYSTEM AND METHOD FOR LOCATING AN OBJECT IN THREE DIMENSIONS BASED UPON MULTIPLE FIDUCIALS USING MACHINE VISION both by Aaron S. Wallack, and expressly incorporated herein by reference.

BACKGROUND OF THE INVENTION

1. Field of the Invention

This invention relates to machine vision systems and more particularly to uses for advanced machine vision search tools that identify and register patterns transformed by at least two translational and at least one non-translational degree of freedom.

2. Background Information

In the past, there have been several tools such as three dimensional cameras, which have been able to acquire range images, a digital image where the values of the pixels represent the distance from a point or plane fixed with respect to the camera tool. This range image data, however, has not been employed with machine vision systems utilizing rotation/scale-invariant (RSIS) search tools. Current search tools are used in conjunction with cameras that acquire images formed of grey level data. This grey level data, however, does not always accurately or precisely identify movement of an object towards or away from the camera or the distance of the object from the camera.

The use of advanced machine vision systems and their underlying software is increasingly employed in a variety of manufacturing and quality control processes. Machine vision enables quicker, more accurate and repeatable results to be obtained in the production of both mass-produced and custom products. Basic machine vision systems include one or more cameras (typically having solid-state charge couple device (CCD) imaging elements) directed at an area of interest, frame grabber/image processing elements that capture and transmit CCD images, a computer and display for running the machine vision software application and manipulating the captured images, and appropriate illumination on the area of interest.

Many applications of machine vision involve the inspection of components and surfaces for defects that affect quality. Where sufficiently serious defects are noted, a part of a surface is marked as unacceptable/defective. Machine vision has also been employed in varying degrees to assist in manipulating manufacturing engines in the performance of specific tasks. One task using machine vision is visual serving of robots in is which a robot end effector is guided to a target using a machine vision feedback. Other applications also employ machine vision to locate a stationary and/or moving pattern.

The advent of increasingly faster and higher-performance computers, has enabled the development of machine vision systems that employ powerful search tools. Such search tools enable a previously trained/stored image pattern to be acquired and registered/identified regardless of its viewed position. In particular, existing commercially available search tools can register such patterns transformed by at least three degrees of freedom, including two translational degrees (x and y-axis image plane) and at least one non-translational degree (rotation and/or scale, for example). One particular implementation of an advanced search tool is the rotation/scale-invariant search (RSIS) tool. This tool registers an image transformed by at least four degrees of freedom including the two translational degrees (x and y-axis image plane) and at least two non-translational degrees (scale) and rotation within the x-y plane about an axis perpendicular to the plane. Some tools also register more complex transformations such as aspect ratio (rotation out of the plane whereby size on one axis decreases while size in the transverse axis thereto remains the same). These search tools, therefore, enable a specific pattern within the field of view to be located within a camera field of view to be positively identified and located accurately within the vision system's internal reference system (an x, y, scale, rotation coordinate system, for example). The RSIS and other advanced search tools particularly allow for the identification and acquisition of patterns having somewhat arbitrary rotation, scaling and translation with respect to the reference system. In other words, the tool is sufficiently robust to recognize a desired pattern even if it is rotated and larger/smaller/skewed relative to a "model" or trained pattern within the vision system.

In general, advanced machine vision tools acquire an image of a pattern via a camera and analyze the outline or a particular part of the pattern, such as a predetermined fiducial mark. The processing speed of the underlying computer in which the tool resides is sufficient to enable a very large number of real time calculations to be completed in a short time frame. This particularly enables the search tool to determine the coordinates within an image reference system for each analyzed point in the viewed area, and correlate these through repetition with a desired pattern. The search tool may map the locations of various points in the captured image stored points in the model image, and determine whether the captured image points fall within an acceptable range of values relative to the model image points. Using various decision algorithms, the tool decides whether the viewed pattern, in a particular rotation and scale corresponds to the desired search pattern. If so, the tool confirms that the viewed pattern is, in fact, the pattern for which the tool is searching and fixes its position and orientation.

Machine vision systems having a three-degree-of-freedom, or greater, capability (such as RSIS) are available from a number of commercial vendors including Hexavision® from Adept Technology, Inc. of San Jose, Calif., and the popular Patmax® system from Cognex Corporation of Natick, Mass. Advanced machine vision search tools such as Patmax® also have the ability to take advantage of the previous known position of a search subject or target. This narrows the search area to positions relatively near the last known location. Therefore, searching is relatively faster on the next cycle since a smaller area is searched. In addition, these search tools can tolerate partial occlusion of a pattern and changes in its illumination, adding further to their robustness with respect to less advanced machine vision approaches.

One goal of machine vision is to provide a more accurate technique for identifying and locating objects in three dimensions. In the past, as was described above, the search tools have used an image acquired by cameras which generally consist of a plurality of pixels. Each pixel has a value corresponding to light intensity. Though in most cases, the pixels allow the machine vision search tool to identify and register patterns, the tools may, in certain situations, not be as accurate, as possible, in registering the pattern in terms of scale. In particular, systems that measure the relative scale of the pattern which is often accurate only to 0.1% of measured scale, while transformation within the image plane (x,y) is often accurately measured to within 1/40 Pel.

Accordingly, it is an object of this invention to provide a system and method to more accurately identify and register an object using a machine vision system utilizing range data images.

SUMMARY OF THE INVENTION

This invention overcomes the disadvantages of the prior art by providing a system and method for locating and registering a pattern in a range image of an object. The invention uses an advanced machine vision search tool capable of registering an acquired pattern in a range image transformed by at least three degrees of freedom including, generally, at least two translational degrees of freedom and at least one non-translational degree of freedom with respect to an image plane (e.g. x and y-axis plane) as viewed by the machine vision system. The machine vision search tool can be a rotation/scale-invariant search (RSIS) tool, or another equivalent implementation adapted to recognize and locate one of more previously trained patterns regardless of translation and rotation of the pattern within the specified degrees of freedom (four or more in this example).

The range image is preferably acquired by a three-dimensional camera which the value of such pixel represents an accurate distance from the camera to the corresponding point on the object's surface or distance from a reference plane or point fixed with the respect to the camera to an objects surface.

In one embodiment, the system is used to determine if a run time object has moved relative to a training object with respect to the reference plane or point discussed above. The camera preferably also obtains a confidence value for each range pixel. In a preferred embodiment, the values of the pixels are adjusted or smoothed to compensate for low confidence values or depth discontinuity boundaries to produce a synthetic range image. This adjustment uses the confidence values and range and confidence values of the neighboring range pixel to replace inaccurate range pixel values.

In one embodiment, inaccurate range pixel range image measurements are determined and masked from being used in constructing the synthetic range image.

BRIEF DESCRIPTION OF THE DRAWINGS

The foregoing and other objects and advantages of the invention will become clearer with reference to the following detailed description as illustrated by the drawings, of which:

FIG. 4 is an example of the range data values in an acquired range data image;

FIG. 5 is an associated confidence image having a confidence value associated with each range data value of FIG. 4;

FIG. 6 is a constructed range data image applying the confidence values of FIG. 5 to the associated range data values of FIG. 4;

FIG. 7A is a schematic view of a training image and pattern;

FIG. 7B is a schematic view illustrating the area of the image where range values form the pattern in FIG. 7A;

FIG. 7C is an example of the range data values forming the pattern in FIG. 7A;

FIG. 8A is a schematic view of a run-time image with an instance corresponding to the pattern in FIG. 7A;

FIG. 8B is a schematic view illustrating the area of the image where range values form the instance corresponding to the pattern in FIG. 8A; and FIG. 8C is an example of the range data values forming the instance in the run-time image of FIG. 8A.

DETAILED DESCRIPTION OF AN ILLUSTRATIVE EMBODIMENT

Figure 1:
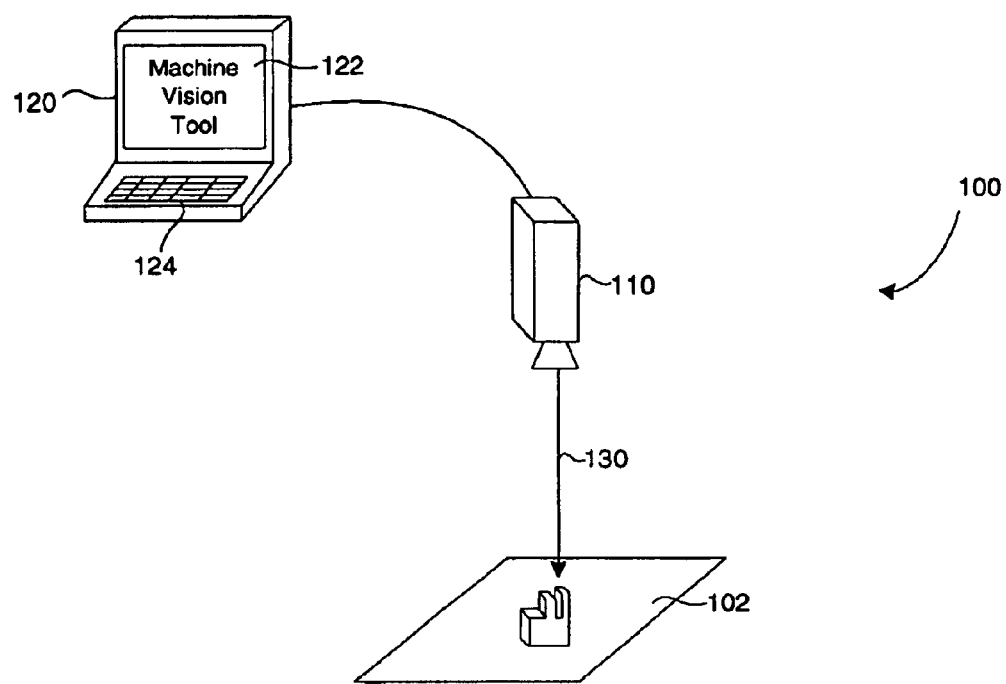
FIG. 1 is a schematic perspective view of a machine vision system having a three-dimensional camera for acquiring range image data according to this invention.

FIG. 1 shows a machine vision system 100 for registering and/or identifying an object or pattern within an area of interest 102 using an image acquisition tool, such as a three-dimensional camera 110. Camera 110 is preferably a range camera with an appropriate image capture device. The camera 110 is interconnected with a computer system 120 having a display 122 and a graphical user interface manipulated by a keyboard 124, mouse and/or similar devices. Residing on the computer 120 is a machine vision search tool and related software as described further below. Note that the term "software," as used herein, refers generally to any number of actions and data structures, whether implemented by a general-purpose processor or any an application-specific or custom processor (example-firmware). A respective reference frame for the camera 110, is shown in which the camera's optical axis 130 is defined as the z axis. Similarly, any transformation of the image along orthogonal x and y-axes are viewed as a change in the relative location of the image within the applicable camera field of view. In addition, rotation about the camera axis 130 (z-axis), is denoted as angular rotation ($\theta$). The degree of rotation ($\theta$) is accordingly viewed as a relative rotation in the viewed image pattern.

The machine vision system according to this invention includes a search tool adapted to register a pattern, based upon a trained image thereof, transformed by at least three degrees of freedom—at least two translational degrees (x and y axes/image plane) and at least one non-translational (scale or rotation $\theta$ in the x-y plane). As referenced above, one such search tool that registers transformation of an acquired image by at least four degrees of freedom including the two translational degrees (x, y) and at least two non-translational degrees (rotation $\theta$ and scale) is the rotation/scale-invariant search (RSIS) tool, such as the above-referenced Patmax® or Hexavision® system.

Note by "translational" it is meant, viewed linear displacement in an image plane clearly viewed by the camera, while "non-translational" means a change in the viewed image outside the parameters of the image plane such as general rotation of the image, or scaling of image, change in aspect ratio (rotation outside the image plane in one axis lying in the plane) and change in skew (simultaneous rotation outside the plane in two planar axes).

The camera 110 is preferably a three-dimensional camera. The camera 110 obtains a digital image ("range image") of an object where the value of each pixel in an acquired digital image ("range value") represents the accurate distance or range from a fixed point or plane with respect to the camera such as, for example, the camera's focal point in the case of some three dimensional cameras, to the corresponding point on the object's surface. Such a three-dimensional camera is sold by Genex Technology, Inc. (GTI) of Kensington Md. under the tradename "Rainbow 3D Camera." For purposes of discussion, these pixels will hereinafter be referred to as "rangers." Preferably, as seen in is FIG. 4, the range image is stored as an x,y matrix, or depth map, with rangel values at each x,y coordinate of the image.

Though the acquisition tool is shown as a three-dimensional camera, it is contemplated that other acquisition tools can be used that can produce range images. Such tools might employ sonar, radar, structures light techniques or laser techniques. For purposes of discussion, all of these acquisition tools will be referred to as three-dimensional cameras.

Figure 2:
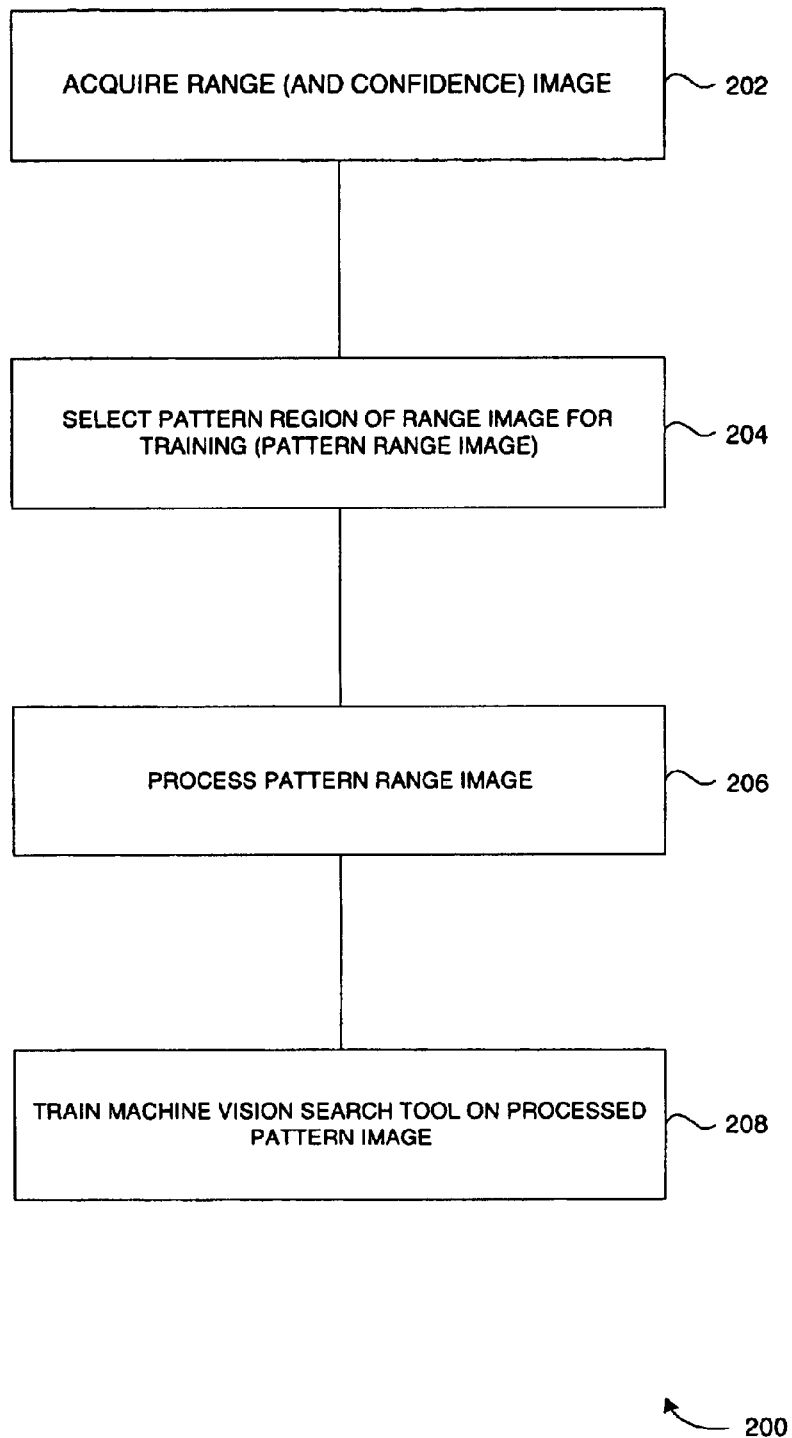
FIG. 2 is a flow diagram of a generalized training procedure for the machine vision system of this invention.

FIG. 2 details a procedure 200 for training the search tool to recognize a specific pattern according to an embodiment of this invention. First, the raw range image (or "training image") of training object 112 (FIG. 1) is "acquired" by camera 110, as set forth in step 202. The acquisition of a pattern can entail the direct viewing of the object under desired conditions (e.g. perpendicular to the axis of the camera and at a known distance/scale), and capture of the viewed image on the computer system display screen 122 by the user.

After the image acquisition, the user then selects a region or portion of the raw range image according to step 204 to form a pattern range image. The selection generally entails use of the graphical user interface to outline the area in the captured image.

FIG. 4, discussed further below, represents a pattern raw range image 400 (or depth map) where the respective range values, for a set of rangels, corresponding to x, y locations on an object's surface is illustrated. The values of the rangels range preferably between 0 and 255. The values of the rangels, preferably can be equated via a known mapping equation, preferably linear, to the actual distance from the fixed point or plane to the location on the objects surface.

Optionally, as seen in FIG. 5, a confidence image 500 can also be obtained by the camera 110, which supplies a confidence value for each rangel in the image 400. The confidence value at the same coordinate as the rangel is the corresponding confidence value for that rangel. The confidence values range from 0 to 255, with 255 being extreme confidence and 0 being no confidence.

Often range image data is noisy at depth discontinuity boundaries. The noisiness can be characterized by the corresponding confidence values. The present invention can optionally process the range values to smooth the pattern range image. Thus, the selected pattern range image can be optionally processed to adjust the value of each rangel to smooth the data according to step 206 in a variety of ways. First, the confidence values in the confidence image 500 of the rangel and the neighboring, can be utilized to smooth the data. If the rangel has a high confidence value, it will be only slightly adjusted or not adjusted at all. The range value of each rangel at location x, y (Rangel$_{(x,y)}$) can be adjusted to a new value (New Rangel$_{(x,y)}$) according to the following formula to form a processed image:

New Rangel$_{(x,y)}$ = Confidence $(x, y)$ * Rangel$_{(x,y)}$ +

(1 − Confidence $(x, y)$) * Weighted Average of Neighboring Rangels

Where Confidence $(x, y) = \dfrac{\text{confidence value of Rangel}_{(x,y)}}{255}$ The number of neighboring rangels considered is determined by the user choosing a σ, or distance variable. All neighbors within ±2σ of the x and y coordinate of the rangel$_{(x,y)}$ will be considered. Alternatively, neighbors further away, such as within ±3σ of the x and y coordinate of the rangel$_{(x,y)}$, could be considered.

The weight accorded each neighboring rangel is based on the distance between the neighbor rangel and rangel$_{(x,y)}$ and the associated confidence value of the neighboring rangel. Neighboring rangels closer to the rangel$_{(x,y)}$ will be accorded more weight than neighboring rangels further away (and having the same confidence value).

The weight accorded a rangel at a position u,v in the x,y plane is determined by the following formula:

$$\text{Weight}(u, v) = e^{-\left(\frac{\delta^2}{\sigma}\right)/2} * \text{Confidence}(u, v)$$

where δ=distance between Rangel$_{(u,v)}$ and Rangel$_{(x,y)}$, and u and v are the x,y coordinates of the neighboring rangels.

The weighted average of the neighboring rangels is derived by adding together the products of the weight of each neighbor rangel multiplied by its associated range value for all the neighbors and dividing that total sum by the sum of the weights of all the neighbors according to the following formula:

Weighted Average of Neighboring Rangels =

$$\dfrac{\sum\limits_{n=(x-2\sigma, y-2\sigma)}^{(x+2\sigma, y+2\sigma)} \text{Weight}(u, v)\, \text{Rangel}_{(u,v)}}{\sum\limits_{n=(x-2\sigma, y-2\sigma)}^{(x+2\sigma, y+2\sigma)} \text{Weight}(u, v)}$$

FIG. 6 illustrates a constructed, processed pattern image 600 (synthetic image) formed by applying the confidence image of FIG. 5 to the range image of FIG. 4 according to the above procedure. Each x,y coordinate contains the adjusted value (New Rangel$_{(x,y)}$).

In addition to smoothing the range data, the processed pattern image 600 may be further processed by having a portion of its rangels masked. Those masked rangels will not be utilized in recognizing patterns in other images. The masking may take place via a variety of methods. One method applies the confidence values to the rangels. If the confidence value of a rangel is less than a certain threshold, for example 123, then the associated rangel would be masked or given some value so that the machine vision tool would not use it in its pattern recognition and identification. (Alternatively if the confidence of neighboring rangel within a given distance to rangel$_{(x,y)}$ is less than a given threshold, rangel$_{(x,y)}$ could be masked.)

Another masking method is to mask the rangel if the value of any of the adjacent neighboring rangels differs by more than a given threshold. Adjacent neighboring rangels are those which are horizontally, vertically or diagonally abutting the rangel. For example, adjacent neighboring rangels to a Rangel$_{(x,y)}$ can include Rangel$_{(x-1,y-1)}$, Rangel $_{(x,y-1)}$, Rangel$_{(x+1,y-1)}$, Rangel$_{(x-1,y)}$, Rangel$_{(x+1,y)}$, Rangel$_{(x-1,y+1)}$, Rangel$_{(x,y+1)}$ and Rangel$_{(x+1,y+1)}$.

Once the pattern range image is captured, selected, and processed, the user directs the machine vision search tool to be trained on the processed pattern range image (or "trained image") (step 208). The search tool is now capable of recognizing the pattern in a variety of orientations and distances/scales.

In certain cases, the selected pattern range image may not need to be processed (smoothed, masked or otherwise processed) and the search tool could be trained on the unprocessed pattern range image (FIG. 4).

Note, that the acquisition (step 202) could alternatively include the downloading of a stored pattern range image where a standardized image such as two dimensional wireframes extracted from three dimensional (CAD drawings) or a previously acquired pattern range image was used. Likewise, a "trained model" derived from an earlier training session can be downloaded from a storage site. The user thereby restores the trained pattern and avoids the necessity of engaging in the overall training procedure.

In the past, machine vision search tools have analyzed and used images stored as grey-level bitmaps, where the pixels instead of containing depth or range data contained intensity data at each x,y coordinate. If a machine vision search tool is not able to analyze range image data, the range image data can be converted, by algorithm or the like, to grey levels, for these tools.

Figure 3:
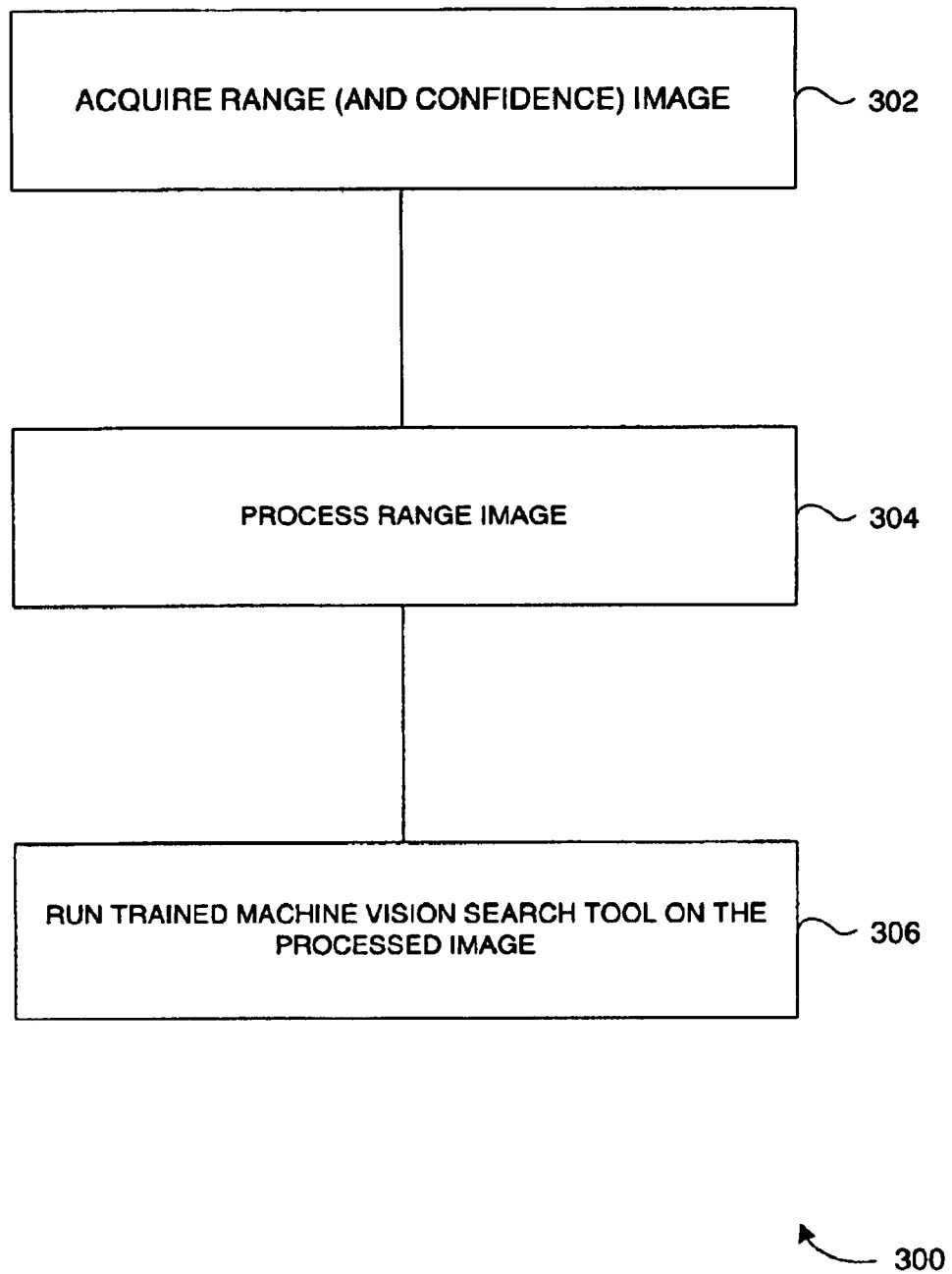
FIG. 3 is a flow diagram of a generalized identification/registration process procedure for a machine vision system of this invention.

As seen in FIG. 3, a process 300 for running the machine vision tool on an object ("run-time object") is shown. According to step 302, the image of an object is acquired by camera 110 ("run-time image") in the same manner as set forth in step 202. Preferably, the camera 110 and the object to be viewed are in substantially the same relation as the camera and the trained object were in the training procedure, detailed above, and in FIG. 2, (e.g. the object to be analyzed is perpendicular to the axis of the camera and substantially at the same distance from the camera's focal point).

The acquired image, as shown in step 304, is then optionally processed (smoothed and/or masked) in the same manner as the training procedure (step 206 of procedure 200) for acquiring a processed image. The machine vision tool is then run on the processed run-time image to properly identify and register an instance of the trained image in a known manner (step 306). The machine vision tool, alternatively could be run on the image acquired in step 302 if no processing is needed.

The machine vision system can determine if the run time object is in a different position relative to a trained object placed at a known position during training. After the run time image has been identified and registered, as described above, the machine vision system compares the range values of the run time image to the range values in the trained image. For example, the range values corresponding to the trained pattern and the instance of the trained pattern can be averaged. If the averages differ, the run time image has moved relative to the trained image. The difference in the average corresponds to a relative distance change or relative movement between the trained object and the run time object with respect to a distance or range from the fixed point or plane discussed above.

For example, FIG. 7A schematically illustrates a training image 700 which includes a rectangular region 702 of the image 700 corresponding to a pattern region (the smiley face) used to form the pattern range image. FIG. 7B schematically illustrates that all the range values in the sectioned rectangular area 702 are used to form the pattern image. For simplicity, and for purposes of discussion, the pattern image includes six range values in a 3×2 matrix in FIG. 7C (actual images will typically have more range values). FIG. 8A similarly illustrates a run time image 800 in which a pattern (the smiley face) has been identified by the machine vision search tool as an instance of the pattern of the training image 700 (step 306). FIG. 8B illustrates that all the range values in a sectioned rectangular area 802 correspond to the instance. FIG. 8C represents in a 3×2 matrix the six range values corresponding to the instance. The average of the range values of the trained image is 116 (700/6) and the average of the range values of the instance in the run time image 800 is 91 (550/6).

The average difference is 25 which corresponds to a distance difference from the trained image indicating that the run time image is at a different distance from the camera than the trained image. This information could be very useful for quality control purposes. The information could show, for example, that products are too thick or too thin or that a piece in a process is not in the correct position for later processing.

The foregoing has been a detailed description of a preferred embodiment of the invention. Various modifications and additions can be made without departing from the spirit and scope thereof. For example, a variety of ranging camera types can be used in accordance with this invention including those employing radar, sonar, laser range finders, coincidence range finders or a combination of techniques. Accordingly, this description is meant to be taken only by way of example, and not to otherwise limit the scope of the invention.

What is claimed is:

1. A machine vision system comprising:

an acquisition system for acquiring a first range image of an object, the first range image including a plurality of range data, wherein each datum of the range data includes a range value and an associated confidence value;

a machine vision search tool coupled to the acquisition system for locating an instance of a trained pattern in the image, the tool registering the trained pattern transformed by at least two translational degrees of freedom and at least one non-translational degree of freedom with respect to an image plane; and processing means to construct the image, including means for producing range values for the range image by adjusting each of the range values by applying the confidence value associated with the range value to be adjusted, and the confidence values and range values of neighboring portions of the first range image.

2. The system as set forth in claim 1, wherein the acquisition system includes a three-dimensional camera.

3. The system as set forth in claim 1, wherein the processing means includes means for preventing a portion of the range image from being considered by the machine vision search tools.

4. The system as set forth in claim 3, wherein the prevention means includes means for comparing the confidence value of each range datum to a threshold value and preventing the associated range value from being considered if the confidence value does not exceed the threshold.

5. A method for locating and registering a pattern in an image comprising:

acquiring a range image of an object with a camera having a camera axis and an image plane perpendicular to the camera axis, the range image comprising a plurality of range values, each of the range values relating to a distance between an associated position on a surface of the object and the camera;

acquiring a plurality of confidence values wherein each of the confidence values is associated with a respective one of the range values;

locating and registering a trained pattern in the range image with a machine vision search tool adapted to register transformation of the pattern by at least two translational degrees of freedom within a respective image plane and at least one non-translational degree of freedom comprising a respective axis perpendicular to the image plane; and adjusting each of the range values to derive adjusted range values, so that each of the range values is adjusted based on the confidence values each associated respectively with based on range values and range values, and each of the associated confidence values, being associated with portions of the object's surface within a given distance of the portion of the object's surface that is associated with the respective range value being adjusted.

6. The method as set forth in claim 5, wherein the camera is a three-dimensional camera and the step of acquiring includes interconnecting the three-dimensional camera to the machine vision search tool.

7. The method as set forth in claim 5, wherein the step of acquiring includes determining which of adjacent range values associated with neighboring portions of the object's surface should be considered by the machine vision search tool.

8. The method as set forth in claim 7, wherein the step of determining includes comparing each of the confidence values associated with the adjacent range values to a given threshold, and not considering the corresponding adjusted range values when the associated confidence values are less than the given threshold.

9. The method as set forth in claim 5, further comprising training the search tool to recognize the pattern including exposing the search tool to a training image containing the pattern and selecting a window that contains the pattern so as to cause the search tool to store a pattern of the selected window with the pattern therein.

10. A computer-readable medium executed on a computer for locating and registering a pattern in an image, the computer-readable medium comprising program instructions for performing the steps of:

acquiring a range image of an object with a camera having a camera axis and an image plane perpendicular to the axis the range image comprising a plurality of range values, each of the range values relating to a distance between an associated position on a surface of the object and the camera;

acquiring a plurality of confidence values wherein each of the confidence values is associated with a respective one of the range values;

locating and registering a trained pattern in the range image with a machine vision search tool adapted to register transformation of the pattern by at least two translational degrees of freedom within a respective image plane and at least one non-translational degree of freedom comprising a respective camera axis perpendicular to the image plane; and adjusting each of the range values to derive adjusted range values so that each of the range values is adjusted based on the confidence values each associated respectively with based on range values and, range values and each of the associated confidence values being associated with portions of the object's surface within a given distance of the portion of the object's surface that is associated with respective of the range value being adjusted.

11. The computer-readable medium as set forth in claim 10, wherein the acquisition tool is a three-dimensional camera and the step of acquiring includes interconnecting the three-dimensional camera to the machine vision search tool.

12. The computer-readable medium as set forth in claim 10, wherein the step of acquiring includes determining which of adjacent range values associated with neighboring portions of the object's surface should be considered by the machine vision search tool.

13. The computer-readable medium as set forth in claim 12, wherein the step of determining includes comparing each of the confidence values associated with the adjacent the range values to a given threshold, and not considering the corresponding adjusted range values when the associated confidence values are less than the given threshold.

14. The computer-readable medium as set forth in claim 10, further comprising training the search tool to recognize the pattern including exposing the search tool to a training image containing the pattern and selecting a window that contains the pattern so as to cause the search tool to store a pattern of the selected window with the pattern therein.

15. A method for locating and registering a pattern in an image comprising:

acquiring a trained pattern range image of a first object at a first position with a camera having a camera axis and an image plane perpendicular to the camera axis, including acquiring a plurality of first range values and associated confidence values, each first range value relating to a distance between an associated portion on a surface of the first object and the camera;

acquiring a run-time range image of a second object at a second position with the camera having a camera axis and an image plane perpendicular to the camera axis, including acquiring a plurality of second range values and associated second confidence values, each of the second range values relating to a distance between an associated portion on a surface of the second object and the camera;

adjusting each of the second range values based upon the second confidence values associated with the second range values and based upon neighboring second range values and second confidence values associated with the neighboring second range values;

locating and registering an instance of the trained pattern range image in the run-time range image with a machine vision search tool adapted to register transformation of the pattern by at least two translational degrees of freedom and one non-translational degree of freedom comprising a respective axis perpendicular to the image plane; and comparing the instance with the trained pattern range image to determine relative distance of the second object at the second position from the first object at the first position.

16. The method as set forth in claim 15, wherein the step of comparing includes, respectively, averaging the first range values and the portion of the second range values corresponding to the instance to obtain first and second averages, and comparing the averaged first range values and the averaged second range values to determine the relative distance.

* * * * *